Patented June 10, 1952

2,599,650

UNITED STATES PATENT OFFICE 2,599,650

6-ALKOXY-2-TETRALONES

Max Matter, Worb, near Berne, and Hans von Sprecher, Gumligen, near Berne, Switzerland, assignors to Haco-Gesellschaft A. G., Gumligen (Canton Berne), Switzerland, a Swiss company No Drawing. Application November 28, 1950, Serial No. 198,026. In Switzerland November 30, 1949

7 Claims. (Cl. 260—465)

The main object of the present invention is the production of new 6-alkoxy-2-tetralones carrying a substituent in the 1-position.

It has been found that some 6-alkoxy-2-tetralones which are substituted in the 1-position are suitable as intermediates for the synthesis of oestrone and other oestrogenous substances.

Furthermore it has been discovered that the new 6-alkoxy-2-tetralones carrying an alkyl group in the 1-position and corresponding to the following general formula

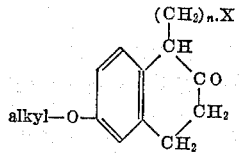

in which $n$ is 2 or 3 and X is —CN or —COO-alkyl, may be prepared by condensing a 6-alkoxy-2-tetralone with a compound of the formula

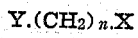

$$Y.(CH_2)_n.X$$

wherein Y stands for halogen,
X stands for —CN or —COO-alkyl and
$n$ stands for the integer 2 or 3, the condensation being carried out in such a manner that the grouping —$(CH_2)_n.X$, wherein X and $n$ have the above meaning, enters into the 1-position of the 6-alkoxy-2-tetralone.

The condensation may be effected by converting the 6-alkoxy-2-tetralone in an anhydrous solvent into the salt of a strongly basic cation, e. g. potassium, sodium or benzyltrimethylammonium. Such salts may be prepared by methods employed for other compounds containing a $CH_2$-group capable of alkylation, e. g. by reaction with metallic potassium, sodamide, sodium tert.-butylate, sodium triphenylmethyl, or benzyltrimethylammonium hydroxide or alcoholate. These salts of the tetralones can then be reacted with a halogenated fatty acid nitrile or ester of the general formula $Y.(CH_2)_n.X$, wherein X, Y and $n$ have the above meaning, e. g. γ-bromobutyronitrile, isobutyl γ-chlorobutyrate, or β-iodopropionitrile, to give the new intermediates in good yield.

The new compounds may also be obtained by treating a mixture of a 6-alkoxy-2-tetralone and the ω-halogeno-propionic or -butyric derivative with a suitable acid-binding material, e. g. sodamide.

The invention is illustrated but not limited by the following example, in which the parts are by weight except where otherwise stated.

Example 1

4 parts of potassium are powdered in 250 parts by volume of benzene under an atmosphere of nitrogen and with exclusion of moisture, and a solution of 16.3 parts of 6-methoxy-2-tetralone in 40 parts by volume of benzene is added. After refluxing for an hour with good stirring 20 parts of methyl γ-chlorobutyrate are added, and the mixture is refluxed, with stirring, for 3 hours. After standing for 12 hours at 20° C., the reaction mixture is diluted with ether, washed with water, dried over sodium sulphate and evaporated. From the residue the excess of γ-chlorobutyric ester is distilled off at a pressure of 12 mm. Hg. Fractional distillation of the residue at a pressure of 0.01 mm. Hg then gives 11 parts of 1-(γ-carbomethoxypropyl)-6-methoxy-2-tetralone, boiling-point 135-138° C., as a viscous oil, together with 5.1 parts of unchanged 6-methoxy-2-tetralone.

The new keto-ester is identified as 2:4-dinitrophenylhydrazone, which after recrystallisation from a mixture of dioxan and methanol melts at 138.5-139.5° C.

In place of methyl γ-chlorobutyrate there may be used the equivalent quantity of methyl γ-iodobutyrate.

Example 2

6 parts of potassium are powdered in 250 parts by volume of benzene under an atmosphere of nitrogen and with exclusion of moisture, and a solution of 25 parts of 6-methoxy-2-tetralone in 50 parts by volume of benzene is added with stirring. When the reaction subsides, the mixture is refluxed for one hour with stirring in a current of nitrogen. After cooling to 30° C., 30 parts of γ-chlorobutyronitrile dissolved in 50 parts by volume of benzene is added dropwise during 15 minutes. The whole is then refluxed for 3 hours and finally allowed to stand for 12 hours at 20° C.

The reaction mixture is diluted with ether, the solution washed with water, dried over sodium sulphate and evaporated. From the residue the excess of γ-chlorobutyronitrile is first distilled off at about 75° C. at a pressure of 12 mm. Hg. By fractionation at a pressure of 0.01 mm. Hg, 15.0 parts of 1-(γ-cyanopropyl)-6-methoxy-2-tetralone are obtained as a viscous oil, boiling-point 140-145° C./0.01 mm., together with 9.5 parts of 6-methoxy-2-tetralone.

The new keto-nitrile is identified as 2:4-dinitrophenylhydrazone, which after recrystallisation from chloroformethanol melts at 136-137° C.

If in place of 6 - methoxy - 2 - tetralone the equivalent quantity of 6-ethoxy-2-tetralone is used, there is obtained 1-(γ-cyanopropyl)-6-ethoxy-2-tetralone.

Example 3

5.3 parts of 6-methoxy-2-tetralone are treated, with stirring and exclusion of moisture under an atmosphere of nitrogen, with 1.0 part of sodamide in 50 parts by volume of toluene, and stirring is continued for 30 minutes at 20° C. After cooling in a mixture of salt and ice, 5.3 parts of ethyl β-bromopropionate dissolved in 20 parts by volume of toluene are added dropwise slowly with stirring. After allowing the temperature to rise slowly to 20° C., the mixture is allowed to stand for 12 hours at 20° C.

The reaction mixture is diluted with ether, washed successively with dilute sulphuric acid, sodium bicarbonate solution and water, dried over sodium sulphate and evaporated. The residue is distilled at high vacuum at a pressure of 0.01 mm. Hg. There are obtained 3.8 parts of a distillate boiling from 80–170° C./0.01 mm. By fractionation of this distillate there result 2.0 parts of 1-(β-carbethoxyethyl)-6-methoxy-2-tetralone, boiling point 120° C./0.01 mm., as a viscous oil.

The new keto-ester is identified as 2:4-dinitrophenylhydrazone, which on recrystallisation from a dioxan-ethanol mixture melts at 125° C.

In place of ethyl-β-bromopropionate there may be used the equivalent quantity of isopropyl β-iodopropionate, whereby there is obtained 1-(β-carboisopropoxyethyl)-6-methoxy-2-tetralone.

What we claim is:

1. As new compounds, the β-tetralones of the general formula

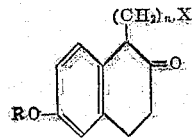

wherein R is alkyl, n is an integer from 2 to 3 and X is a member selected from the group consisting of —CN and —COO-alkyl.

2. As new compounds, the β-tetralones of the general formula

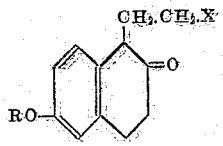

wherein R is alkyl and X is a member selected from the group consisting of —CN and —COO-alkyl.

3. As new compounds, the β-tetralones of the general formula

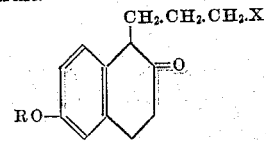

wherein R is alkyl and X is a member selected from the group consisting of —CN and —COO-alkyl.

4. As a new compound, the β-tetralone of the formula

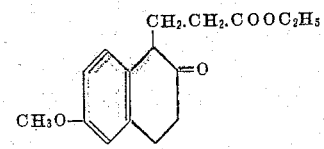

5. As a new compound, the β-tetralone of the formula

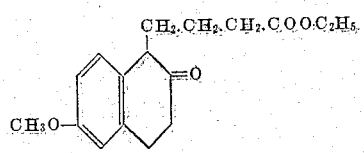

6. As a new compound, the β-tetralone of the formula

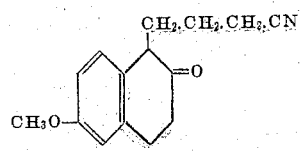

7. As a new compound, the β-tetralone of the formula

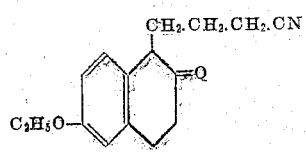

MAX MATTER.
HANS VON SPRECHER.

REFERENCES CITED

The following references are of record in the file of this patent:

UNITED STATES PATENTS

| Number | Name | Date |
| --- | --- | --- |
| 2,386,736 | Bruson | Oct. 9, 1945 |
| 2,394,962 | Bruson | Feb. 12, 1946 |

OTHER REFERENCES

Haberland: Ber. Deut. Che., vol. 72 B, pp. 1222–1226 (1939).

Elsevier's Encyclopedia of Org. Chem., vol. 12 B, p. 2546 (1950).